(12) United States Patent
Mayr et al.

(10) Patent No.: US 11,675,788 B2
(45) Date of Patent: Jun. 13, 2023

(54) GENERATION OF QUERY EXECUTION PLANS

(71) Applicant: SAP SE, Walldorf (DE)

(72) Inventors: Manuel Mayr, Walldorf (DE); Till Merker, Sandhausen (DE)

( * ) Notice: Subject to any disclaimer, the term of this patent is extended or adjusted under 35 U.S.C. 154(b) by 480 days.

(21) Appl. No.: 16/371,679

(22) Filed: Apr. 1, 2019

(65) Prior Publication Data

US 2020/0311083 A1 Oct. 1, 2020

(51) Int. Cl.
*G06F 16/2453* (2019.01)
*G06F 9/54* (2006.01)
*G06F 16/22* (2019.01)

(52) U.S. Cl.
CPC .......... *G06F 16/24542* (2019.01); *G06F 9/54* (2013.01); *G06F 16/2246* (2019.01); *G06F 16/2255* (2019.01); *G06F 16/2453* (2019.01); *G06F 16/24537* (2019.01)

(58) Field of Classification Search
CPC ............. G06F 16/2393; G06F 16/2453; G06F 16/24539; G06F 16/24542; G06F 16/24535; G06F 16/2246; G06F 16/2255; G06F 9/54; G06F 16/54; G06F 16/24537
See application file for complete search history.

(56) References Cited

U.S. PATENT DOCUMENTS

| 11,036,734 | B2* | 6/2021 | Bellamkonda | .... G06F 16/24556 |
| 2018/0173759 | A1* | 6/2018 | Barsness | .......... G06F 16/24542 |
| 2020/0019552 | A1* | 1/2020 | Deng | ................ G06F 16/24542 |

* cited by examiner

*Primary Examiner* — Marcin R Filipczyk
(74) *Attorney, Agent, or Firm* — Mintz Levin Cohn Ferris Glovsky and Popeo, P.C.

(57) ABSTRACT

A query is received at a database execution engine. A query plan is generated by the database execution engine and for execution of the query. The query plan includes a first operator including computer executable instructions that upon execution queries a data structure of a database, determines whether the data structure satisfies a precondition for execution of a second operator of the query plan, and generates a signal indicating that the precondition is not satisfied. Execution of the query plan is initiated. A new query plan is generated by the database execution engine and in response to receiving the signal indicating that the precondition is not satisfied. Related systems, methods, and articles of manufacture are also described.

21 Claims, 5 Drawing Sheets

GENERATION OF QUERY EXECUTION PLANS

TECHNICAL FIELD

The subject matter described herein relates to database management, and more particularly, query execution planning.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In an aspect, a query is received at a database execution engine. A query plan is generated by the database execution engine and for execution of the query. The query plan includes a first operator including computer executable instructions that upon execution queries a data structure of a database, determines whether the data structure satisfies a precondition for execution of a second operator of the query plan, and generates a signal indicating that the precondition is not satisfied. Execution of the query plan is initiated. A new query plan is generated by the database execution engine and in response to receiving the signal indicating that the precondition is not satisfied.

One or more of the following features can be included in any feasible combination. For example, the signal can include an exception that causes further execution of the query plan to terminate. The precondition can include a value of a flag included in the data structure and/or a predefined condition. The precondition can test whether content of the data structure has changed since generation of the query plan. The second operator can include a database operator that processes content of the data structure. Generating the new query plan can include re-compiling, by a query optimizer forming part of the database execution engine, at least a portion of the query plan. The data structure can include a table of the database, a column of the table, a fragment, a dictionary, a search tree, and/or a hash map. The generated query plan can be stored in a cache of the database execution engine. A plurality of instances of the query can be received and the query plan stored in the cache can be accessed for each of the plurality of instances of the query. Each respective accessing can be performed prior to respective executions of the query plan and for each of the plurality of instances. The stored query plan within the cache of the database execution engine can be replaced with the new query plan. The generating of the query plan and/or the generating of the new query plan can be performed by a query optimizer forming part of the database execution engine. The database execution engine can include a query optimizer and a query execution engine coupled to the query optimizer, the query optimizer including: an execution interface, a cost function, and a plan compiler including a plan generator; the query execution engine including: an execution interface, a plan execution, precompiled operations, code generated operations, and an execution engine application programming interface.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
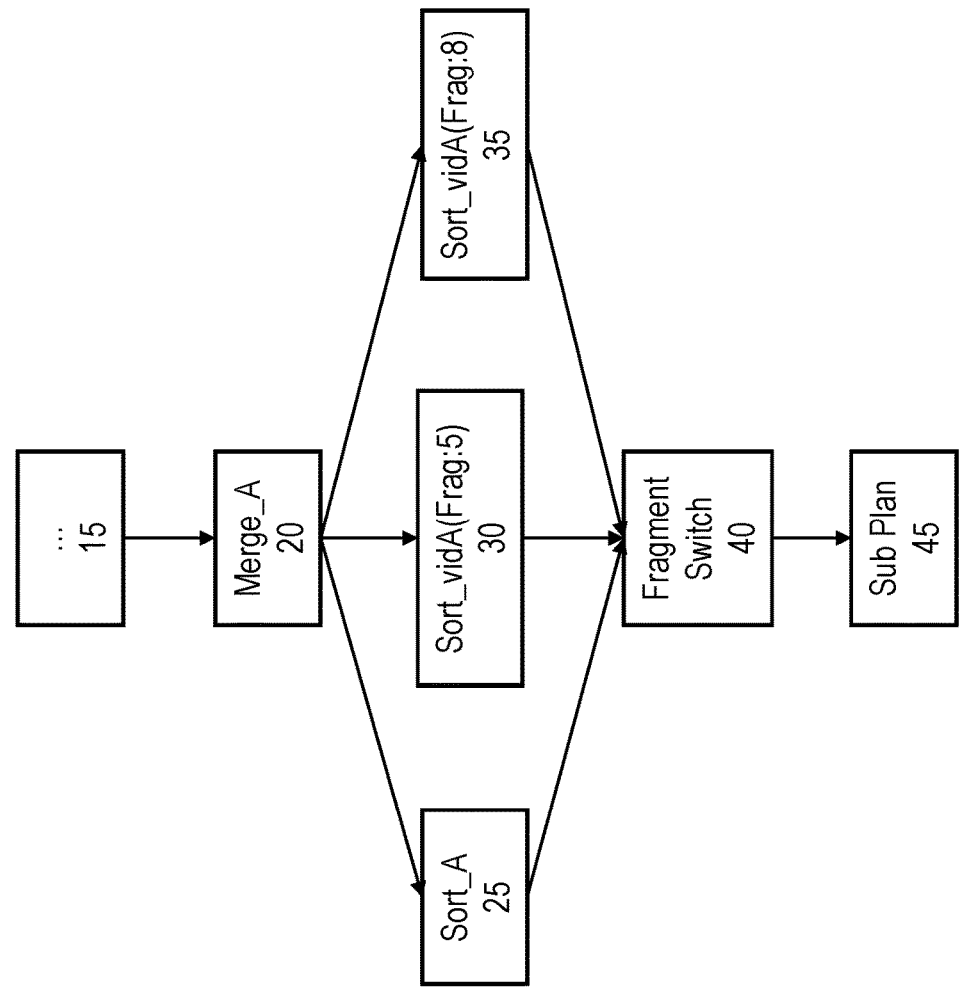
FIG. 1 is an illustration of an example query plan that involves an optimization that leverages an underlying dictionary encoding of several table fragments.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example embodiments, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Furthermore, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Furthermore, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

To prevent expensive recalculation of query plans, many database systems store the query plan in a plan cache for later inspection. On repeated execution of the same query, the system may look up the cached query plan and begin execution without requiring compilation. But such an approach is agnostic to changes in components that are directly involved in the query execution. In other words, because a query plan may be optimized based on the content of the database, the optimization process may result in a query plan that is dependent on the content of the database. As content in the database changes (e.g., additional changes such as writes, PUTs, and the like), the query plan becomes invalid. As a consequence, query plans that are stored in a cache and re-executed multiple times generally cannot include operators that perform optimization based on an ephemeral state of its constituents.

For example, consider the query plan illustrated in FIG. 1, which is an illustration of an example query plan 10 that involves an optimization that leverages an underlying dictionary encoding of several table fragments (5, 8). The example query plan 10 includes a directed acyclic graph with nodes and edges that characterize the operations and sequence thereof. A root node 15 indicates that the query plan may be a sub plan (e.g., a portion of a larger query plan). The query plan 10 includes a merge_A operator 20, which branches to a sort_A operator 25, a sort_vidA(Frag:5) operator 30 and a sort_vidA(Frag:8) operator 35. The query plan 10 further includes a FragmentSwitch operator 40 and another node 45 indicating that the query plan 10 may continue onto additional sub plans. As noted above, in some database systems, the optimized query plan 10 may be retrieved once and later stored in a plan cache for use in subsequent executions. However, whether vid-based sorting is valid (e.g., applicable) for a given fragment is ephemeral (e.g., dependent on the content of the fragment) and thus may change over time (e.g., as the content of the fragment changes). If the query plan 10 were re-executed for a subsequent query after content in the fragment (e.g., 5, 8) is modified such that the content is no longer sorted by vid, the query plan 10 would pursue an invalid strategy.

In order to prevent optimized query plans that may be stored in a plan cache and reused for repeated queries, some aspects of the current subject matter can include interposing a guard operator (sometimes referred to as a sentinel operator) into the query plan. The guard operator can be inserted before or after each optimized operator. The guard operator can shield the query plan from outdated information and check if a particular optimization is still applicable by querying the respective fragment and checking whether a precondition is satisfied. If the information is outdated (e.g., the precondition is not satisfied), the operator can trigger (e.g., generate) a signal that causes invalidation of the plan cache entry and performs a recompilation of the plan with updated information. In some implementations, the signal may be delivered via a return code, an exception, and/or the like. In case of the signal including an exception, a translation mechanism can provide for the exception where the plan cache entry is invalidated.

Figure 2:
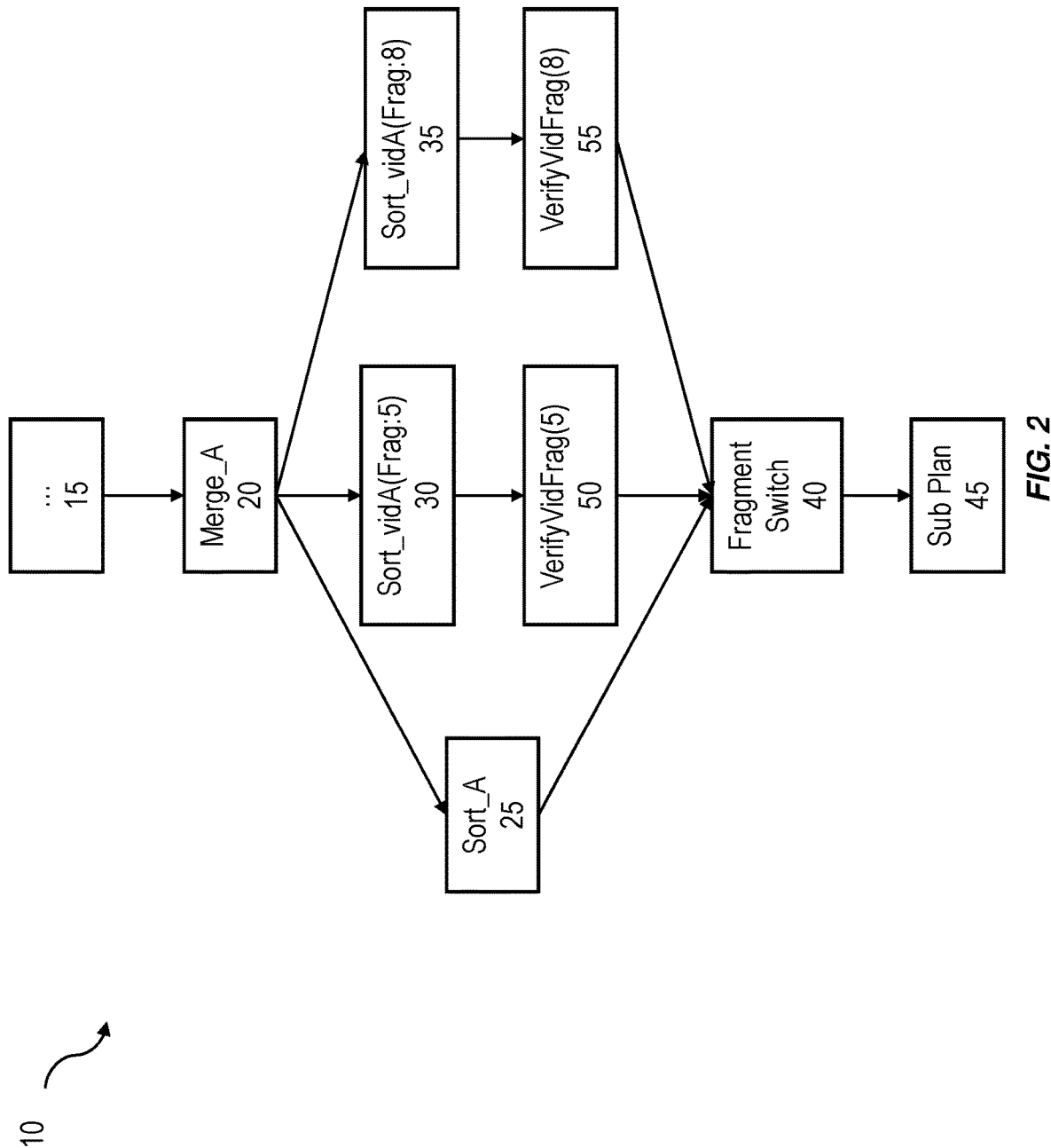
FIG. 2 illustrates an example query plan with guard operators.

For example, FIG. 2 illustrates example query plan 10 with guard operators 50, 55 inserted into the plan. The guard operators 50, 55, are denoted as VerifyVidFrag(5) and VerifyVidFrag(8), respectively. During execution of the query plan 10, each guard operator 50, 55 verifies a precondition (e.g., that the content of their respective fragment (e.g., 5 or 8) is still ordered by vid such that the Sort_vidA operators 30, 35, would be valid on the content of the respective fragments). If the precondition is satisfied (e.g., is true), then the query plan 10 can continue execution. If the precondition is not satisfied (e.g., is false), then the guard operator 50, 55 triggers a signal that causes invalidation of the plan cache entry (e.g., an exception). Such an approach enables query plan caching to be utilized for query plans that include operators that are optimized based on the underlying content upon which the optimized operator relies.

Figure 3:
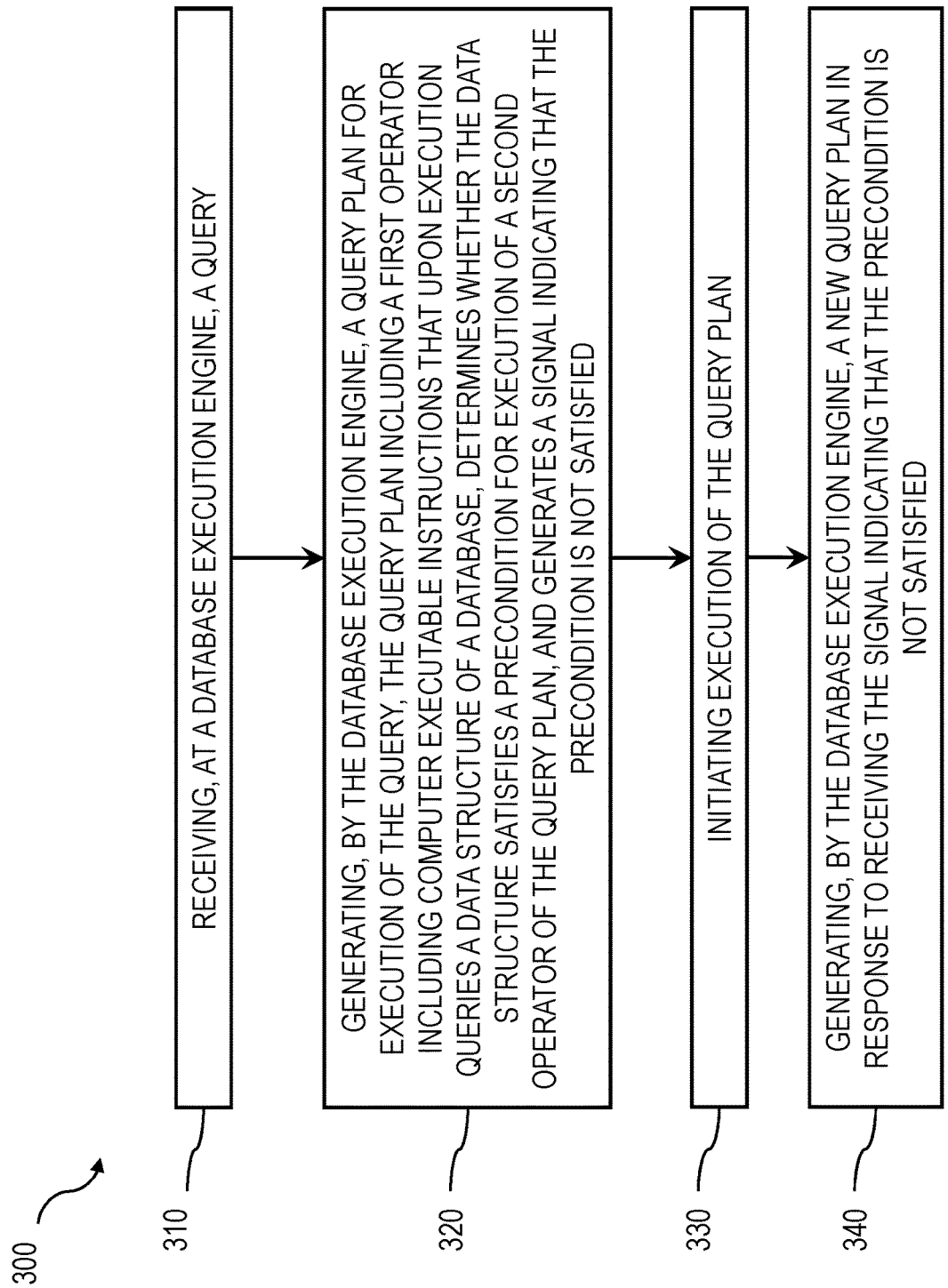
FIG. 3 is a process flow diagram illustrating an example process of query plan generation that enables query plan caching to be utilized for query plans that include operators that are optimized based on the underlying content upon which the optimized operator relies.

FIG. 3 is a process flow diagram illustrating an example process of query plan generation that enables query plan caching to be utilized for query plans that include operators that are optimized based on the underlying content upon which the optimized operator relies.

At 310, a query is received at a database execution engine. An example database execution engine is described below with reference to FIG. 4.

At 320, a query plan is generated for execution of the query. The generating can be performed by the database execution engine. The query plan includes a first operator (e.g., a guard operator) including computer executable instructions that, upon execution, queries a data structure of a database, determines whether the data structure satisfies a precondition for execution (e.g., for valid execution) of a second operator of the query plan, and generates a signal indicating that the precondition is not satisfied. The data structure can include, for example, a table of a database, a column of a table, a fragment, dictionaries, search trees, hash maps, and the like.

The precondition can test whether content of the data structure has changed since generation of the query plan. For example, the precondition can include a value of a flag included in the data structure, a predefined condition, and the like. In an example implementation, the dictionary can be tested for the orderedness of the valueID. The precondition "for all a,b in A: a<=b⇔a_vid<=b_vid" can test whether operations that are specifically tailored to work on value ids can be utilized to perform comparisons by a comparison instruction defined on integers. If the above precondition is false, then the specialized operators can no longer validly operate on the data.

The second operator can include a database operator that processes content of the data structure. For example, a sort based on vid can be an example of a database operator that processes (e.g., reads, writes, and the like) the content of the data structure and may rely on a specific characteristic of the content (e.g., an order by vid) for optimization.

At 330, execution of the query plan can be initiated. For example, the query plan can be provided to a persistence layer of the database. During execution, if a guard operator identifies that the precondition is not satisfied, for example, because the contents of the data structure has changed since the query plan was generated thereby causing optimized operators in the query plan to no longer be valid, the guard operator triggers the signal. The signal can include, for example, an exception that causes further execution of the query plan to terminate.

In some implementations, the generated query plan can be stored in a cache of the database execution engine. The cache can store the query plan for use if when additional instances of the same query are received. For example, multiple instances of the query can be received. For each instance of the query, the query plan stored in the cache can be accessed and executed.

At 340, a new query plan is generated in response to receiving the signal indicating that the precondition is not satisfied. The new query plan can be generated by the database execution engine. In some implementations, generating the new query plan includes re-compiling at least a portion of the query plan. In some implementations, the query plan stored in the case can be replaced with the new query plan. The new query plan can be utilized when subsequent instances of the query are received.

Figure 4:
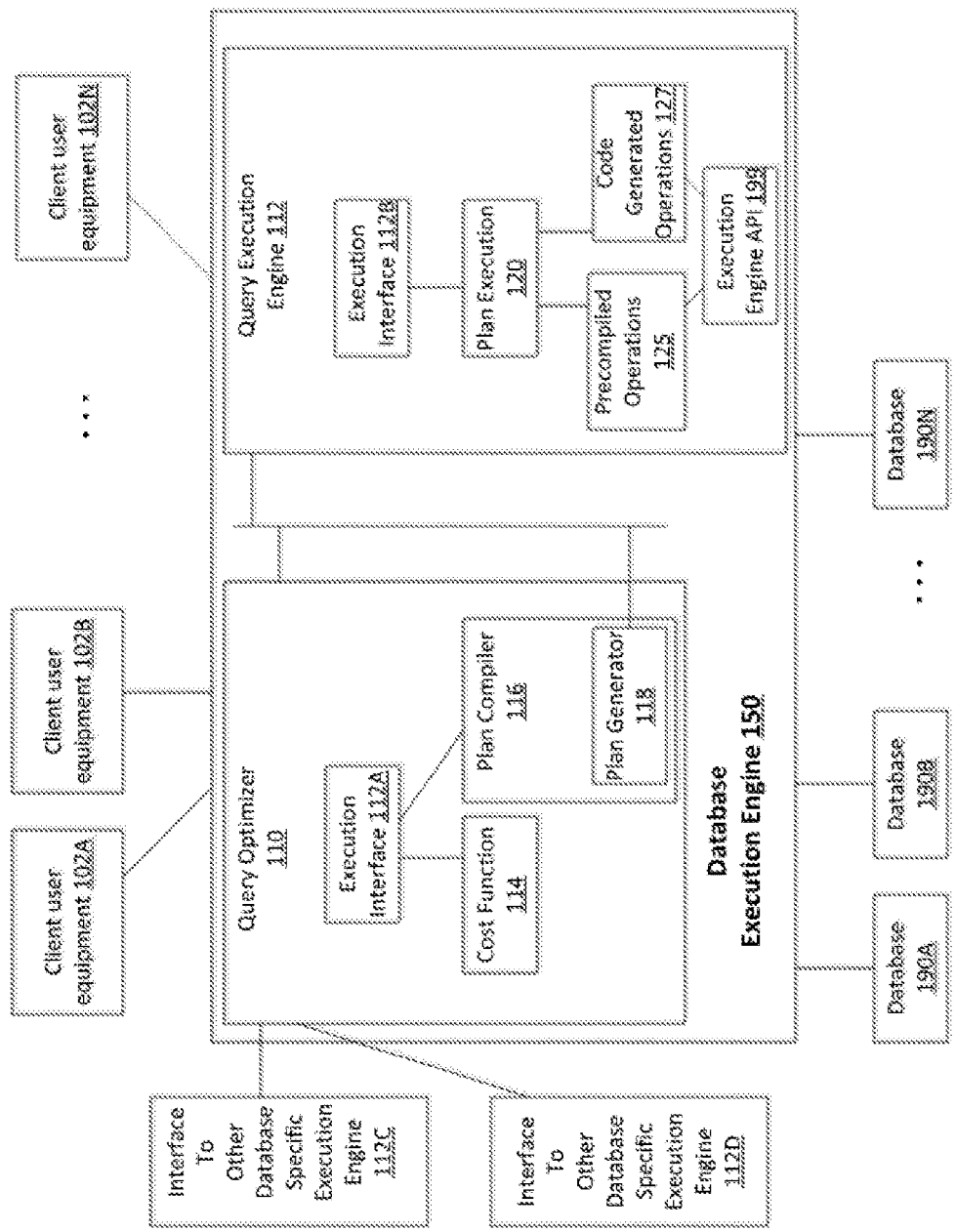
FIG. 4 depicts a block diagram for a system, in accordance with some example embodiments.

FIG. 4 depicts an example of a system 100, in accordance with some example implementations.

The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 4, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra." The query plan can include one or more guard operators, as described in more detail above.

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. The query plan can include one or more guard operators, as described in more detail above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N. The query plan can be stored in a query plan cache of the database execution engine.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operator at Table 1 would result in a call for a dictionary look up for a column "X" for the value ID of "1" and an indexvector scan with a valueid obtained from the dictionary look up, which results in a document ID list that identifies one or more rows in the table 1. Then for each document ID, a call is made via 199 to look up the value IDs for columns A and B. The value IDs may be used to look up dictionary values to materialize, the columns A and B including the actual data values for those columns.

TABLE 1

| Operator | Calls made on Database API |
|---|---|
| 1) TableScan (Filter X = 1) | dictionary lookup column "X" for the value of ID of "1" |
| | indexvector scan with a valueid from the lookup, which results in a document ID (docid) list that identifies one or more rows in table "1". |
| 2) Materialization (Columns A, B) | For each docid, lookup value IDs (valueids) for columns A + B |
| | For the valueids, lookup dictionary value in dictionaries of A and B |

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example embodiments, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution. Furthermore, the query execution engine 150 may provide the ability to access table storage via an abstract interface to a table adapter, which may reduce dependencies on specific types of storage/persistence layers (which may enable use with different types of storage/persistence layers).

In some example embodiments, the database execution engine 150 may be provided with at least one table adapter. In some example embodiments, the table adapter may generate an object, such as a table object, which can be stored in cache with other code, objects, and/or the like awaiting runtime execution of the query. In some example embodiments, and the table object can be opened, during query execution, to provide access to a table stored in the persistence layer of a database.

If, during execution of the query plan that was stored in the query plan cache by the database execution engine, a guard operator included in the query plan determines that a precondition for an associated operator is not satisfied due to a change in the underlying data, the guard operator triggers a signal, such as an exception. The database execution engine handles the exception and can provide the exception or an indication of the exception to the query optimizer 110 for recompilation of the query plan, for example, using the approach described above. The database execution engine can also invalidate the query plan stored in the query plan cache and can replace the query plan stored in the query plan cache with the recompiled (e.g., new) query plan.

Figure 5:
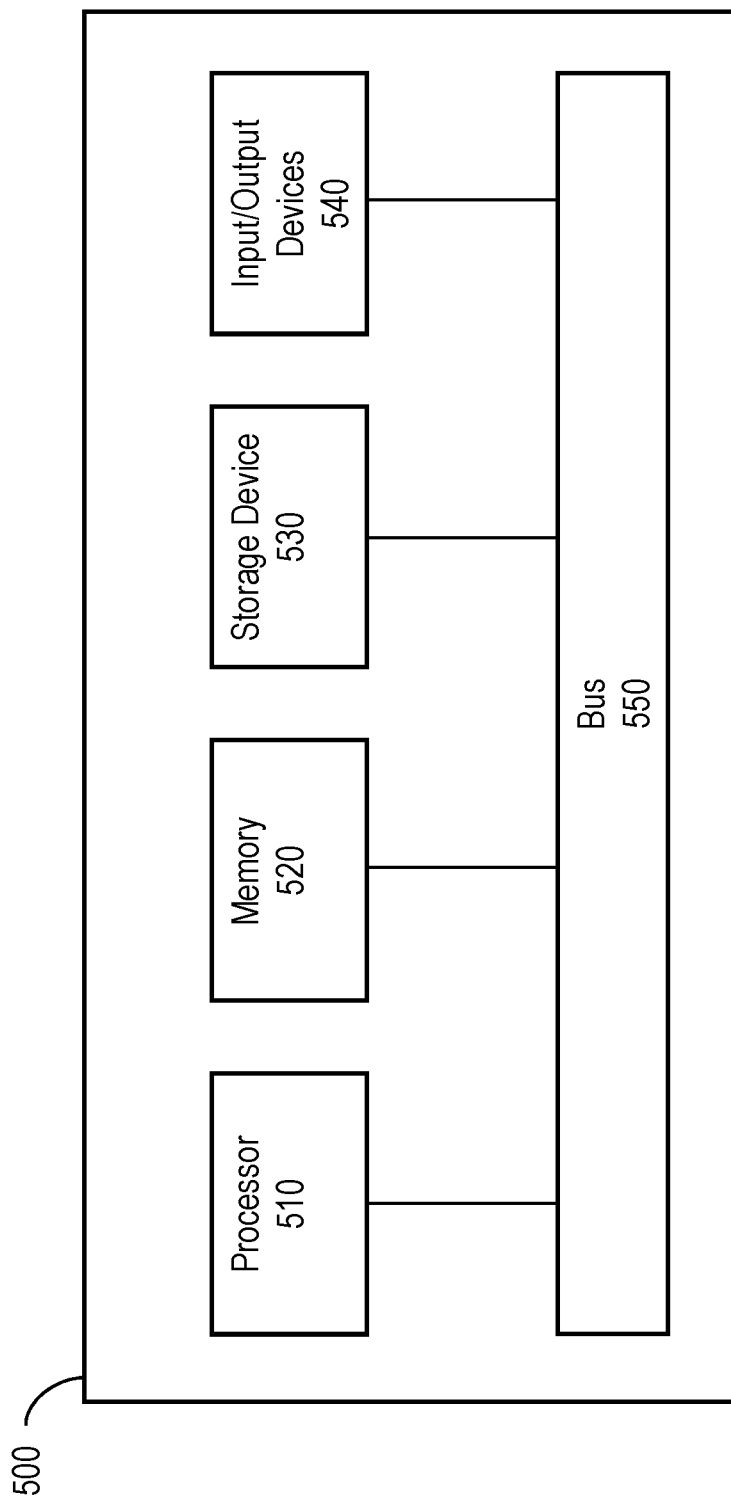
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 4 and 5, the computing system 500 can be used to implement the database management system 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system comprising:
at least one processor including circuitry; and
at least one memory storing instructions which, when executed by the at least one processor, result in operations comprising:
receiving, at a database execution engine, a query;
generating, by the database execution engine, a query plan for execution of the query, the query plan comprising a plurality of sub-plans, a first operator, and a second operator, the first operator shielding the query plan from outdated information and checking if the query plan is still applicable by:
querying a data structure of a database for each sub-plan of the query plan,
determining that the data structure fails to satisfy a precondition for execution of a second operator of the query plan,. the precondition comprising a detection of a data structure change, the second operator relying on a characteristic of the data structure for valid processing of the content of the data structure, and
generating a signal indicating that the precondition fails to be satisfied because a content of the data structure required for valid execution of the second operator has changed during execution of a respective sub-plan of the query plan;
generating, by the database execution engine, a new query plan by re-compiling at least a portion of the query plan; and
executing, by the database execution engine, the new query plan.

2. The system of claim 1, wherein the signal comprises an exception that causes further execution of the query plan to terminate.

3. The system of claim 1, wherein the precondition comprises a value of a flag included in the data structure and/or a predefined condition.

4. The system of claim 1, wherein the precondition tests whether content of the data structure has changed since generation of the query plan.

5. The system of claim 1, wherein the second operator comprises a database operator that processes content of the data structure.

6. The system of claim 1, wherein generating the new query plan comprises re-compiling, by a query optimizer forming part of the database execution engine, at least a portion of the query plan.

7. The system of claim 1, wherein the data structure comprises a table of the database, a column of the table, a fragment, a dictionary, a search tree, and/or a hash map.

8. The system of claim 1, the operations further comprising:
storing the generated query plan in a cache of the database execution engine.

9. The system of claim 8, the operations further comprising:
receiving a plurality of instances of the query; and
accessing, for each of the plurality of instances of the query, the query plan stored in the cache, each respective accessing performed prior to respective executions of the query plan and for each of the plurality of instances.

10. The system of claim 9, the operations further comprising:
replacing, within the cache of the database execution engine, the stored query plan with the new query plan.

11. The system of claim 1, wherein generating the query plan and/or generating of the new query plan is performed by a query optimizer forming a part of the database execution engine.

12. The system of claim 1, wherein the database execution engine comprises a query optimizer and a query execution engine coupled to the query optimizer, the query optimizer including: an execution interface, a cost function, and a plan compiler including a plan generator; the query execution engine including: an execution interface, a plan execution, precompiled operations, code generated operations, and an execution engine application programming interface.

13. The system of claim 1, wherein valid execution of the second operator depends upon content of the data structure not changing since generation of the query plan, wherein the existing query plan comprises a plurality of second operators, and wherein generating the query plan further comprises inserting a respective first operator before or after each of the plurality of second operators.

14. A method comprising:
receiving a query;
generating a query plan for execution of the query, the query plan comprising a plurality of sub-plans, a first operator, and a second operator, the first operator shielding the query plan from outdated information and checking if the query plan is still applicable by:
querying a data structure of a database for each sub-plan of the query plan,
determining that the data structure fails to satisfy a precondition for execution of a second operator of the query plan, the precondition comprising a detection of a data structure change, the second operator relying on a characteristic of the data structure for valid processing of the content of the data structure, and generating a signal indicating that the precondition fails to be satisfied because a content of the data structure required for valid execution of the second operator has changed during execution of a respective sub-plan of the query plan;

generating a new query plan by re-compiling at least a portion of the query plan; and executing the new query plan.

15. The method of claim 14, wherein the signal comprises an exception that causes further execution of the query plan to terminate.

16. The method of claim 14, wherein the precondition comprises a value of a flag included in the data structure and/or a predefined condition.

17. The method of claim 14, wherein the precondition tests whether content of the data structure has changed since generation of the query plan.

18. The method of claim 14, wherein the second operator comprises a database operator that processes content of the data structure.

19. The method of claim 14, wherein generating the new query plan comprises re-compiling, by a query optimizer forming part of a database execution engine, at least a portion of the query plan.

20. The method of claim 14, wherein the data structure comprises a table of the database, a column of the table, a fragment, a dictionary, a search tree, and/or a hash map.

21. A tangible non-transitory computer readable medium storing instructions which when executed by at least one processor forming part of at least one computing system cause the at least one processor to perform operations comprising:

receiving a query;

generating a query plan for execution of the query, the query plan comprising a plurality of sub-plans, a first operator, and a second operator, the first operator shielding the query plan from outdated information and checking if the query plan is still applicable by:

querying a data structure of a database for each sub-plan of the query plan, determining that the data structure fails to satisfy a precondition for execution of a second operator of the query plan, the precondition comprising a detection of a data structure change, the second operator relying on a characteristic of the data structure for valid processing of the content of the data structure, and generating a signal indicating that the precondition fails to be satisfied because a content of the data structure required for valid execution of the second operator has changed during execution of a respective sub-plan of the query plan;

generating a new query plan by re-compiling at least a portion of the query plan; and executing the new query plan.

* * * * *